United States Patent [19]

Ward

[11] Patent Number: 5,047,285

[45] Date of Patent: Sep. 10, 1991

[54] FABRIC, PRESSURE SENSITIVE TAPE

[75] Inventor: Edward S. Ward, Lugoff, S.C.

[73] Assignee: Hermitage Industries, Inc., Camden, S.C.

[21] Appl. No.: 374,527

[22] Filed: Jun. 30, 1989

[51] Int. Cl.$^5$ .............................................. D03D 3/00
[52] U.S. Cl. .................................... 428/229; 428/225; 428/257; 428/258; 428/343; 428/355
[58] Field of Search ............... 428/196, 118, 198, 225, 428/226, 227, 229, 257, 258, 343, 355

[56] References Cited

U.S. PATENT DOCUMENTS

| | | | |
|---|---|---|---|
| 2,281,830 | 5/1942 | Copeman | 428/196 |
| 2,381,061 | 8/1945 | Hallmann | 428/229 |
| 2,491,396 | 12/1949 | Seckel | 428/229 |
| 2,956,331 | 10/1960 | Whitehead | 428/229 |
| 3,085,027 | 4/1963 | Porteous | 428/229 |
| 3,252,484 | 5/1966 | Meyer et al. | 428/258 |
| 3,369,957 | 2/1968 | Caroselli et al. | 428/196 |
| 3,445,055 | 5/1969 | Port et al. | 428/226 |
| 3,586,595 | 6/1971 | Spillane | 428/196 |
| 4,066,106 | 1/1978 | Graham | 428/258 |
| 4,160,057 | 7/1979 | Kogan et al. | 428/245 |
| 4,292,360 | 9/1981 | Riedel et al. | 428/171 |
| 4,303,724 | 12/1981 | Sergeant et al. | 428/229 |
| 4,414,258 | 11/1983 | Corbin | 428/258 |
| 4,435,467 | 3/1984 | Rogers | 428/229 |
| 4,439,482 | 3/1984 | Suematsu | 428/252 |
| 4,503,114 | 3/1985 | Cohen | 428/247 |
| 4,551,382 | 11/1985 | Gagne et al. | 428/258 |
| 4,594,286 | 6/1986 | McKinney et al. | 428/245 |
| 4,632,859 | 12/1986 | Wolfrey et al. | 428/288 |
| 4,636,427 | 1/1987 | Ohno et al. | 428/246 |
| 4,731,281 | 3/1988 | Fleischer et al. | 428/196 |
| 4,772,499 | 9/1988 | Greenway | 428/43 |
| 4,874,019 | 10/1989 | Whetstone | 428/196 |
| 4,892,557 | 1/1990 | Conklin et al. | 428/229 |
| 4,906,520 | 3/1990 | Human | 428/255 |

Primary Examiner—James J. Bell
Attorney, Agent, or Firm—Fish & Richardson

[57] ABSTRACT

A yarn is impregnated with a non-hardening agglutinating sizing. This sizing is preferably tacky resin. A fabric is made with such yarn, at least in the warp. A tape is made with such fabric. The warp is preferably 100 percent polyester. Methods include impregnating yarn with agglutinizing sizing and also ribbonizing yarn.

20 Claims, 2 Drawing Sheets

FABRIC, PRESSURE SENSITIVE TAPE

BACKGROUND OF THE INVENTION

This invention relates to fabric and to pressure sensitive fabric tape.

Various woven fabrics are in use today as reinforcing material for adhesive-type or duct-type tapes. These fabrics are conventionally made of one hundred percent cotton, polyester/cotton blends or polyester/rayon blends in the machine direction (warp yarn) and one hundred percent cotton, polyester/cotton blends, polyester/rayon blends, or one hundred percent polyester in the cross-direction (weft yarn). The tape support fabric provides strength to the tape in processing and in use. It is desirable that such tape tear neatly when ripped by hand across the tape. Low count fabric has been used for tape support (having counts of from 44×28 to 18×9, for example).

FIG. 1 schematically shows a typical prior art tape 10 in exploded perspective view, having a woven tape support fabric 12 and a film backing layer 16. The woven tape support fabric 12 includes warp yarns 22 which run in the longitudinal or roll direction of the tape, interwoven with weft yarns 24 which run across (usually perpendicular to) the warp yarns. The backing layer 16 is typically laminated to the tape support fabric 12 by an adhesive layer 14. An adhesive layer 20 is applied, either as part of application of adhesive layer 14 or in a separate step, to the underside of tape support fabric 12. A conventional release coat 18 may also be applied to the backing to make it easier to separate the tape adhesive layer 20 from the backing 18 as the tape is peeled from the roll. Depending upon the material used for the tape support fabric 12, it may also be necessary to first apply an adhesion layer (not shown) to either side of the fabric to enable the adhesive layers 14, 20 to adhere to the fabric and to prevent delamination.

FIG. 2 is a cross-sectional view of tape support fabric 12 through line I—I of FIG. 1 looking along the warp direction of tape 10; the warp yarns 22 are shown intersecting a strand of weft yarn 24. The warp yarns typically have a sizing 26 applied longitudinally along the circumference of the yarn in a process known as "slashing". Coating the warp yarns with the sizing mixture provides both a protective capsule and also lubrication. The coating reduces the likelihood of breaking the yarns during the weaving process. As shown, the conventional tape support fabric 12 has a dimensional profile (or thickness) "A" defined by the peaks 28 of the weft yarn.

U.S. Pat. No. 4,303,724 discloses use of texturized weft yarns, such as polyester or nylon, in the filling of "30's" cotton warp gauze (24×20 or 20×12 count) to achieve better tear characteristics in adhesive tapes incorporating such fabrics. The patent also teaches that use of texturized weft yarns is beneficial because such yarns flatten out and spread more than non-texturized yarns. Thus, less adhesive mass is needed to unite the backing substrate (e.g., a pliable film), the texturized-weft fabric, and the mass into an integral tape.

U.S. Pat. No. 4,439,482 discloses a tape base fabric using a "flat" (i.e., untexturized) warp yarn of polyester fibers containing a specific heat-reactive chemical residue in the molecular chain of the yarn material. The yarn is heated to activate the residue and to modify the yarn when the yarn is used as the warp of the base fabric. The weft may also be a flat polyester yarn either with or without the polymer modification. The polymer modification changes the strength-elongation character of the yarn within the fabric.

In conventional yarn production, continuous filament yarns (such as polyester or nylon), as opposed to conventional blends and natural fibers, receive a very light coating of a mineral type oil to lubricate the yarn for subsequent high speed processes, such as beaming (i.e., winding the yarn onto wide aluminum spools or "section beams" for use in weaving). Normally the oil is applied at an add-on rate of three percent by yarn weight. Continuous filament yarns are readily available in untexturized and texturized form.

SUMMARY OF THE INVENTION

One aspect of the present invention relates to a yarn impregnated with a non-hardening agglutinating sizing. This aspect may include any of the following features: the sizing includes a synthetic polymer resin; the sizing includes, at about 85 percent by weight, and ester of dihydric alcohol and terephthalic acid; the sizing is tacky; or the yarn is made substantially of polyester, nylon, aramid or olefin.

In another aspect of the invention, a fabric includes a warp yarn cooperating with a weft yarn, with the warp yarn carrying a resin for adhering the warp yarn to the weft yarn at the points where they intersect in the fabric. This aspect may include any of the above features and as follows: the warp yarn is ribbonized out of round as viewed in a section across its longitudinal axis; the resin is non-hardening agglutinating sizing; the sizing is so tacky as to cause the warp to at least nominally adhere to the weft; the warp yarn is impregnated with the sizing; the warp is continuous filament or spun polyester yarn; the warp is substantially comprised of polyester, nylon, aramid or olefin; the warp yarn has a resin add-on content by weight of preferably over 2 to less than 15 percent, more preferably 4 to 7 percent, most preferably 5 percent; the warp yarn is in the range of 30 to 300 denier, and preferably 100 denier; the warp yarn includes an oil add-on content of about one percent or below by weight; or the warp yarn is woven with weft yarn in a count range preferably of from about 18×9 to 60×40, and more preferably 24×12.

In another aspect of the invention, a tape support fabric has ribbonized warp yarn processed with an agglutinating resin sizing to an add-on content of preferably over 2 to less than 15 percent by weight.

In another aspect of the invention, a pressure sensitive tape has a backing bound to a woven tape support fabric and an adhesive mass coating applied thereto, the tape support fabric includes a synthetic warp yarn which is inherently tacky during weaving. The above aspect may include any of the following features: the warp yarn is a polyester; the warp yarn is ribbonized; the warp yarn is impregnated with a non-hardening agglutinating sizing which makes the warp tacky during weaving; the sizing includes a synthetic polymer resin; the warp yarn includes an add-on resin content preferably of over 2 to less than 15 percent by weight; the warp yarn includes an add-on oil content of about one percent or less by weight; the fabric has a count preferably between about 18×9 and 60×40 and more preferably 24×12; or the warp yarn is about 100 denier.

In another aspect of the invention, a process for forming an open weave fabric includes weaving the fabric with a warp yarn having a non-hardening agglutinating sizing applied to it before weaving.

In another aspect of the invention, a method of bonding adhesive to a fabric having a synthetic warp yarn includes treating the warp yarn with an agglutinating sizing, weaving the fabric, and then applying the adhesive to the fabric.

In another aspect of the invention, a process for forming an adhesive tape includes the steps of laminating a backing to a tape support fabric and applying an adhesive to the fabric, the process also includes the prior step of forming the fabric by applying a non-hardening sizing to a warp yarn and calendering the yarn out of round prior to weaving the fabric.

In another aspect of the invention, a method of ribbonizing a synthetic yarn includes impregnating a yarn with an inherently tacky sizing and calendering the impregnated yarn.

BRIEF DESCRIPTION OF THE DRAWINGS

We first briefly describe the drawings.

DETAILED DESCRIPTION OF THE PREFERRED EMBODIMENT

Figure 3:
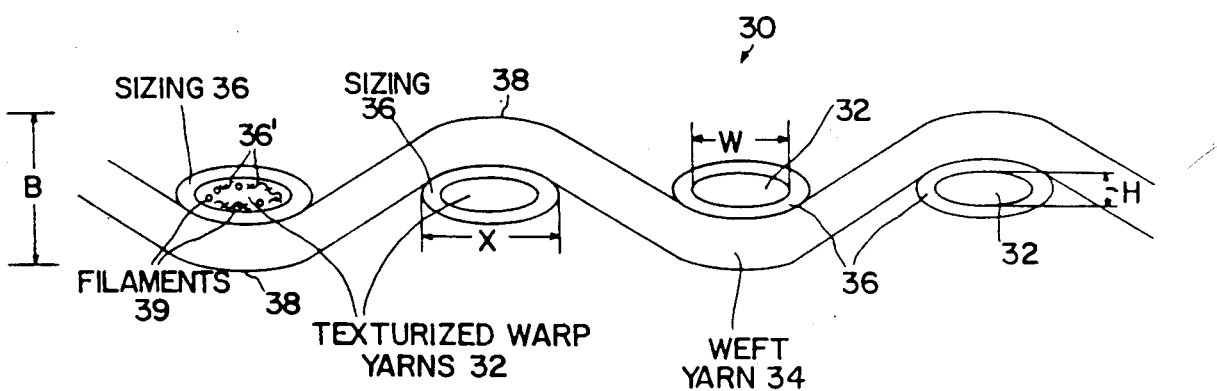
FIG. 3 is a cross-sectional view of a fabric in accordance with the invention.

Turning now to FIG. 3, our preferred tape support fabric 30 includes a multiplicity of roughly parallel strands of continuous filament warp yarns 32 having a non-hardening (i.e., substantially non-hardening at standard temperature and pressure) agglutinating sizing 36 applied thereto. The warp yarns 32 are ribbonized (i.e., flattened) perpendicular to their longitudinal axes during processing. The resulting ribbon-like warp yarns 32 are interwoven with weft yarn. A single strand 34 of weft yarn is shown in FIG. 3 Tape support fabric 30 has a thickness "B" defined between the peaks 38 of weft yarn 34. It is preferred that the warp be a 100 percent polyester continuous filament yarn; in an alternative embodiment, the warp may be a 100 percent spun polyester yarn. We prefer to use a texturized continuous filament warp yarn in tape support fabric because of the strength of this type of yarn.

We have found that continuous filament warp yarn does not require much oil for processing. In fact, we have determined that oil levels higher than approximately one percent by weight add-on will interfere with the ability of the adhesive to adhere to the yarn, and can also interfere with the slashing (sizing) techniques disclosed below. However, a small amount of oil is required to allow the yarn to withstand the beaming process. We have found that oil add-on levels from 0.5 percent to 0.75 percent by yarn weight are preferred in our process. More than about one percent seems to inhibit the resin sizing which we have developed from adhering to the yarn. Hence, any high oil level yarn is preferably passed through a bath of dispersant prior to the application of the sizing mixture, so as to reduce the oil content to a workable level (i.e., to a level where the sizing will adhere adequately in view of the specific requirements of the intended use).

A preferred embodiment of our agglutinating sizing formula includes water (in gallons) and a slurry of 30 percent by weight polyester resin (in pounds) in a ratio of 2:5. This resin sizing formulation does not require cooking, as in typical starch sizing baths; the sizing is heated only to emulsify the resin in the water. (A conventional sizing formula of corn starch and other components is cooked at approximately 275° F.)

Our sizing formula is applied at an add-on rate of approximately 5 percent of the weight of the yarn, measured after drying. An add-on rate of about 2 percent to 15 percent is acceptable. If such sizing is used, and if the yarn has an oil add-on level in excess of perhaps about one percent, then a dispersant bath may be required prior to application of the sizing formula. However, it is contemplated that a sizing may be used in practice of the invention which permits use of higher oil content yarns.

The sizing is preferably of a similar chemical composition to the material used to make the warp yarn. A commercially available polyester resin is Eastman Chemicals LB100, "Water Dispersable Size", which is suitable for use with polyester warp. This resin is one of a class of synthetic polymers including at least 85 percent by weight of an ester of dihydric alcohol and terephthalic acid. However, other polymer resins can be used to treat the yarns within practice of the present invention.

The sizing is designed to be and to remain tacky or sticky. It will be understood, however, that use of tacky sizing is considered anathema to standard weaving practice, and attention must be paid to the yarn path in all areas of the loom to avoid snagging in practice of the present invention. Thus, we express our preferred limit of tackiness as not so high as to cause the yarns to stick together after slashing.

By means of comparison, our preferred LB100-based sizing applied to 100 percent polyester yarn in the appropriate amount (such as at 5 percent add-on) has perhaps around 10 percent of the tackiness of the glue used on a conventional 3M Post-It ® pad, which is a patented product of Minnesota Mining and Manufacturing Company. At this level of tackiness, the sizing is preferably not tacky to the touch, but rather is tacky enough to hold the weft yarn in its pattern during the weaving process and during subsequent normal handling. (In any event, it is noted that the above tackiness comparison is merely provided by way of illumination and not by way of limitation.)

Manufacture of Tape Support Fabric

In a preferred process for manufacture of our tape support fabric, first a continuous filament yarn, such as a 100 denier texturized 100 percent polyester yarn, is mounted into the creel of a beamer (a machine for winding warp yarn onto section beams). The yarn is drawn from the creel of the beamer and then is wound onto a section beam. Yarn in the 100 denier range is very easily damaged by over-stretching, and, therefore, the creels should be equipped with tensioning devices to avoid such damage. The beamers used for the continuous filament yarn are preferably equipped with spindle drive units, which turn the beam to pull the yarn from the creel instead of surface or drum drives as used for conventional spun yarn. All of these features are intended to prevent fraying and separation of the yarn filament.

The full section beams are loaded into a slashing apparatus. Slashing is a critical step in preparing our warp yarn for weaving. The beneficial properties of the new tape support fabric are both created and affected by the slashing process. In this step, the sizing is applied and then calendered with a flocked squeeze roll.

Figure 1:
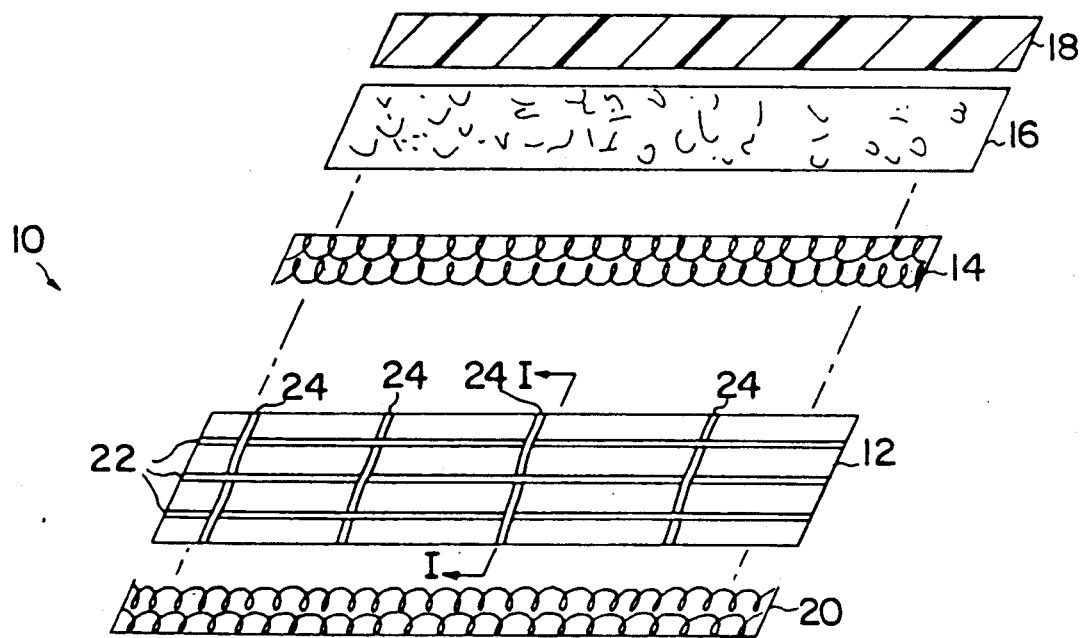
FIG. 1 is an exploded perspective view of a conventional adhesive tape.
Figure 2:
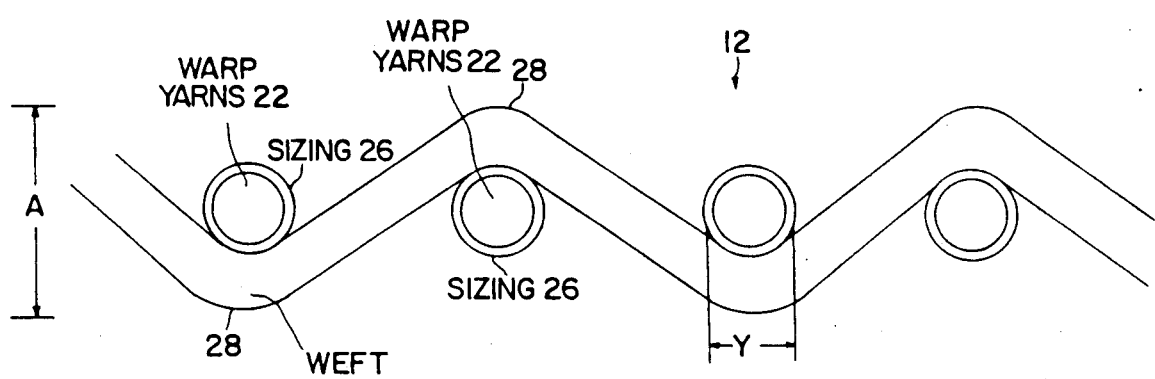
FIG. 2 is a cross-sectional view of the tape support fabric of FIG. 1, taken along line I—I.

Referring again to FIG. 3, it will be seen that the calendering flattens the yarn, making it ribbon-like in shape, with its width W being greater than its height H. This ribbonized profile provides a widened warp contact area X for the weft to meet and rest upon, versus contact area Y in the unribbonized prior art warp such as shown in FIG. 2. The tacky resin provides durability to the yarn and also serves to hold the ribbonized profile by infiltrating between the yarn filaments during the sizing process, as indicated by sizing 36' between filaments 39 in FIG. 3. Hence, the yarn is not simply coated with sizing, as in conventional slashing. It will be understood, of course, that it is possible to vary the slurry temperature, resin composition ratio, application speed, degree of calendering and roll hardness to adjust for a desired resin add-on level and flattening of the yarn. At any rate, the resulting yarn is both impregnated with the sizing during the slashing process and is ribbonized.

In one example, polyester resin-based agglutinating sizing was applied at 96° C. at a rate of about 70 yards per minute at about a 5 percent add-on rate. The resin was applied and calendered with a flocked squeeze roll having a Rockwell hardness of 60.

The prepared yarn now can be woven into tape support fabric. The fabric is preferably woven in a count range of from about 18×9 to 60×40. The weaving process for the fabric is generally the same as for other tape support fabrics, with the exception that regard must be paid to warp tension and snag avoidance; the light sley (number of warp ends per inch) of the fabric (most preferably a 24×12 count) combined with the fineness of the yarn (preferably 100 denier) demands that the loom beam tension be controlled carefully.

Manufacture of Tapes

In a preferred process, a sheet of film (such as polyethylene) is laminated to the tape support fabric with a heated adhesive layer applied onto the fabric side of the laminated structure. The finished product is cooled and then wound onto large batch rolls. These rolls are unrolled and slit lengthwise into predetermined widths. The slit strips of tape are rewound onto cardboard cores to make rolls of a given length.

In production, the laminated material tends to stick to the adhesive applicator roll and must be pulled forcefully from the surface of the roll. Fabric strength is critical at this point. Fabrics made using existing technologies, which are capable of passing this point in the process, are much thicker than the warp fabric materials of the present invention, and consume greater amounts of adhesive.

There are several reasons why significantly less adhesive is required in manufacture of the tape product of the present invention compared to conventional tape of similar performance characteristics: For example, the new fabric with its ribbonized warp yarn is thinner (measurement B) by approximately 10-20 percent compared to similar fabric with the same yarn conventionally sized (measurement A); thus, the thinner fabric requires less adhesive because the fabric presents smaller voids to be filled by the adhesive. Also, since the warp yarn is ribbonized, the fabric presents a more accessible surface area for the adhesive to contact. We believe that the amount of adhesive required for a tape in practice of the invention may be about 20 percent to 40 percent less than conventional tapes of equal performance.

In any event, because the yarn is impregnated with an agglutinating sizing and is ribbonized, we can provide a broad contact area to receive the weft, the tackiness holding the warp's ribbonized profile, holding the weft in its resting place against the warp, and holding the adhesive when applied to the woven fabric.

Improved Performance

Tape made with our new tape support fabric, despite the fact that it is thinner, performs well or better than conventional fabric tape in tensile strength tests. There are several reasons for the improved tensile strength. First, a stronger warp yarn (such as one hundred percent texturized polyester) now can be readily used (because the resin-treatment and the ribbonizing enable sufficient bonding of the adhesive to the polyester yarn). Next, the tackiness of the resin causes the fabric to bind at the intersections of the yarns; this improves tensile strength, since the warp yarns will receive lateral support from the bound weft yarns. Also, ribbonizing the warp provides greater contact area between the tacky warp and the weft, for improved mechanical binding at the warp/weft yarn intersections.

As a result of these improvements, we create a stronger web which can maintain its integrity (as does the ribbonized profile maintain its integrity) during weaving, processing and final use, compared to the weaves of conventional tape. Thus, a strong warp yarn (which ordinarily may have difficulty accepting or holding adhesive) can be used, and with less adhesive, to create a stronger, thinner, lighter weight tape which is easier to tear in a straight line across the warp, compared to conventional tape. Furthermore, for a given length, the thinner tape can be made into smaller rolls. The smaller rolls now can be shipped in smaller, less expensive cartons which occupy less shipping and warehouse space.

The present invention also contemplates use of the new ribbonizing, sizing process on weft yarns, either with conventional warp yarns or with the new ribbonized and sized warp yarns. As well, while texturized polyester yarns are preferred, other yarns may be employed in practice of the various aspects of our invention. Knitting structures would similarly benefit from the invention. In practice, the present invention enables production of fabric materials and tapes for bookbinding, sealing, seaming and various other uses.

Other embodiments are within the following claims.

I claim:

1. A fabric comprising a warp yarn cooperating with a weft yarn, wherein the warp yarn is ribbonized out of round as viewed in a section across its longitudinal axis and only the warp yarn carries a non-hardening agglutinating sizing which is only so tacky as to cause the warp yarn to adhere nominally to the weft yarn where the warp and weft yarns intersect in the fabric.

2. The fabric of claim 1 wherein the warp yarn is impregnated with the sizing.

3. The fabric of claim 1 wherein the warp is continuous filament or spun polyester yarn.

4. The fabric of claim 1 wherein the warp is substantially comprised of polyester, nylon, aramid or olefin.

5. The fabric of claim 4 wherein the sizing comprises a synthetic polymer resin.

6. The fabric of claim 1 wherein the warp yarn comprises an oil add-on content of about one percent or below by weight.

7. A pressure sensitive tape with a backing bound to the a woven tape support fabric of claim 1 and an adhesive mass coating applied thereto.

8. The tape of claim 7 wherein the warp yarn is a polyester.

9. The tape of claim 7 wherein the sizing comprises a synthetic polymer resin.

10. The tape of claim 8 wherein the warp yarn comprises an add-on resin content preferably of over 2 to less than 15 percent by weight.

11. The tape of claim 10 wherein the warp yarn comprises an add-on oil content of about one percent or less by weight.

12. The tape of claim 7 wherein the fabric has a count between about 18×9 and 60×40.

13. The tape of claim 7 wherein the warp yarn is about 100 denier.

14. The fabric of claim 1, wherein the warp yarn has a resin add-on content by weight of 2 to 15 percent.

15. The fabric of claim 1, wherein the warp yarn has a resin add-on content by weight of 4 to 7 percent.

16. The fabric of claim 1, wherein the warp yarn has a resin add-on content by weight of 5 percent.

17. The fabric of claim 1, wherein the warp yarn is in the range of 30 to 300 denier.

18. The fabric of claim 1, wherein the warp yarn is 100 denier.

19. The fabric of claim 1, wherein the warp yarn is woven with the weft yarn in a count range of from about 18×9 to 60×40.

20. The fabric of claim 1, wherein the warp yarn is woven with the weft yarn in a count of about 24×12.

* * * * *